United States Patent
Watanabe

(10) Patent No.: US 11,114,095 B2
(45) Date of Patent: Sep. 7, 2021

(54) INFORMATION PROCESSING DEVICE

(71) Applicant: SONY CORPORATION, Tokyo (JP)

(72) Inventor: Akihiro Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 216 days.

(21) Appl. No.: 16/301,234

(22) PCT Filed: Feb. 20, 2017

(86) PCT No.: PCT/JP2017/006081
§ 371 (c)(1),
(2) Date: Nov. 13, 2018

(87) PCT Pub. No.: WO2017/208518
PCT Pub. Date: Dec. 7, 2017

(65) Prior Publication Data
US 2020/0320989 A1   Oct. 8, 2020

(30) Foreign Application Priority Data
May 30, 2016 (JP) .............................. JP2016-107113

(51) Int. Cl.
*G10L 15/22* (2006.01)
*G06F 9/451* (2018.01)
*G06F 3/16* (2006.01)

(52) U.S. Cl.
CPC ............ *G10L 15/22* (2013.01); *G06F 3/167* (2013.01); *G06F 9/453* (2018.02);
(Continued)

(58) Field of Classification Search
None
See application file for complete search history.

(56) References Cited

U.S. PATENT DOCUMENTS

2003/0115302 A1* 6/2003 Teraoaka ................ G06F 16/10
709/221
2008/0154828 A1* 6/2008 Antebi ................ G06F 16/2462
706/46

(Continued)

FOREIGN PATENT DOCUMENTS

| JP | 2009-193532 A | 8/2009 |
| JP | 2010-250439 A | 11/2010 |

(Continued)

OTHER PUBLICATIONS

Quarteroni, Silvia, and Suresh Manandhar. "A chatbot-based interactive question answering system." Decalog 2007 83 (2007). (Year: 2007).*

(Continued)

*Primary Examiner* — Jonathan C Kim
(74) *Attorney, Agent, or Firm* — Chip Law Group

(57) ABSTRACT

Provided is an information processing device that includes a reception unit that receives inquiry information, an acquisition unit that acquires answer information in response to the inquiry information from at least one or more acquisition destination candidates determined on a basis of the inquiry information, and a sending unit that sends response information that is generated on a basis of the answer information. The acquisition unit sends a request using a common data format to the at least one or more acquisition destination candidates, and acquires the answer information using a common data format based on the request.

17 Claims, 12 Drawing Sheets

(52) U.S. Cl.
CPC .. *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 2008/0243744 A1* | 10/2008 | Isaacs | G06F 16/243 | 706/46 |
| 2012/0041950 A1* | 2/2012 | Koll | G06F 16/90332 | 707/728 |
| 2012/0078873 A1* | 3/2012 | Ferrucci | G06F 16/3329 | 707/708 |
| 2012/0095861 A1* | 4/2012 | Feng | G06Q 10/00 | 705/26.7 |
| 2013/0124554 A1* | 5/2013 | Linyard | G06F 16/954 | 707/769 |
| 2014/0136187 A1* | 5/2014 | Wolverton | G10L 15/22 | 704/9 |
| 2014/0280087 A1* | 9/2014 | Isensee | G06F 16/3329 | 707/723 |
| 2014/0304257 A1* | 10/2014 | Ben Shahar | G06F 16/3344 | 707/723 |
| 2015/0074095 A1* | 3/2015 | Enders | G06F 40/40 | 707/725 |
| 2015/0193682 A1* | 7/2015 | Baughman | G06F 16/24575 | 707/728 |
| 2015/0293917 A1* | 10/2015 | Bufe, III | G06N 5/02 | 706/12 |
| 2015/0347900 A1* | 12/2015 | Bell | G06N 5/02 | 706/11 |
| 2015/0356146 A1* | 12/2015 | Yamashita | G06F 16/24575 | 707/722 |
| 2016/0034457 A1* | 2/2016 | Bradley | G06F 16/24522 | 707/749 |
| 2016/0078102 A1* | 3/2016 | Crouch | G06F 16/313 | 707/722 |
| 2016/0124951 A1* | 5/2016 | Barker | G06F 16/3334 | 706/12 |
| 2016/0171062 A1* | 6/2016 | Bufe | H04L 67/36 | 707/722 |
| 2016/0196334 A1* | 7/2016 | Bastide | G06F 16/3344 | 707/776 |
| 2016/0239487 A1* | 8/2016 | Potharaju | G06F 16/24578 | |
| 2016/0283360 A1* | 9/2016 | Allen | G06F 11/3688 | |
| 2016/0292593 A1* | 10/2016 | Agarwalla | G09B 7/06 | |
| 2016/0364377 A1* | 12/2016 | Krishnamurthy | G06F 40/30 | |
| 2017/0004182 A1* | 1/2017 | Simpson | H04L 67/306 | |
| 2017/0006032 A1* | 1/2017 | Simpson | H04W 4/21 | |
| 2017/0091312 A1* | 3/2017 | Ajmera | G06F 16/3329 | |
| 2017/0097951 A1* | 4/2017 | Nachiappan | G06F 16/25 | |
| 2017/0099249 A1* | 4/2017 | Kozareva | G06F 16/353 | |
| 2017/0169101 A1* | 6/2017 | Walia | G06F 16/3344 | |
| 2017/0228372 A1* | 8/2017 | Moreno | G06F 16/3329 | |
| 2017/0243107 A1* | 8/2017 | Jolley | G06N 5/02 | |
| 2017/0286396 A1* | 10/2017 | Sandor | G06F 40/35 | |
| 2018/0219807 A1* | 8/2018 | Thinguldstad | G06F 16/3329 | |
| 2018/0331839 A1* | 11/2018 | Gao | G06Q 10/107 | |
| 2019/0050239 A1* | 2/2019 | Caldwell | G06F 11/079 | |
| 2019/0122124 A1* | 4/2019 | Kartchner | G06N 5/022 | |
| 2019/0297120 A1* | 9/2019 | Nallaperumal | G06F 16/3329 | |
| 2020/0320989 A1* | 10/2020 | Watanabe | G06F 9/453 | |

FOREIGN PATENT DOCUMENTS

| | | |
|---|---|---|
| JP | 2012-248161 A | 12/2012 |
| JP | 2013-205523 A | 10/2013 |
| JP | 2015-230662 A | 12/2015 |

OTHER PUBLICATIONS

International Search Report and Written Opinion of PCT Application No. PCT/JP2017/006081, dated Mar. 28, 2017, 10 pages of ISRWO.

Office Action for JP Patent Application No. 2018-520359, dated Feb. 9, 2021, 9 pages of Office Action and 9 pages of translation.

* cited by examiner

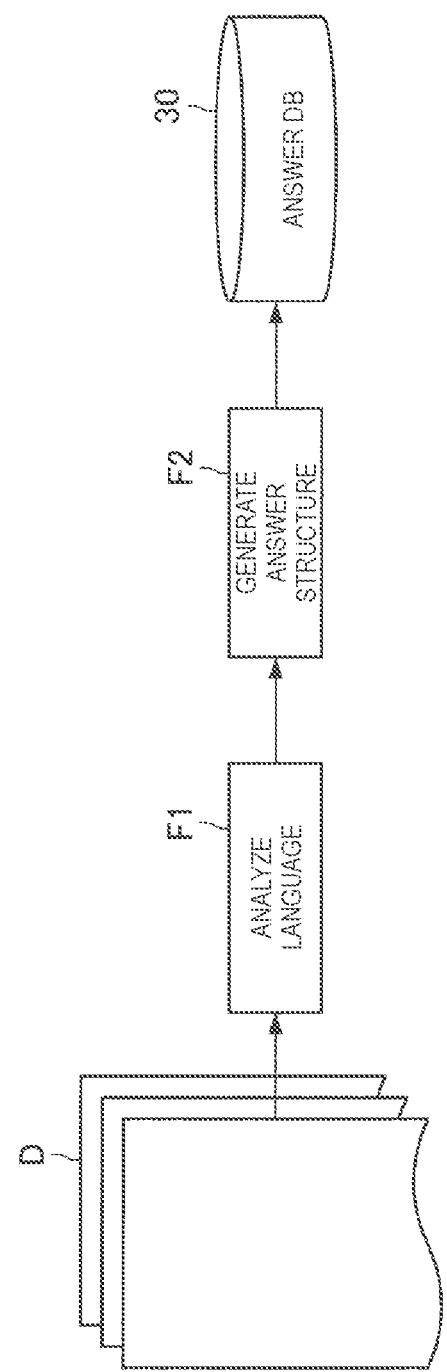

FIG. 6

```
{
  "q": "NOT ABLE TO BE CONNECTED TO SERVICE A ON TV",
  "status": "0",
  "userId":"123456",
  "product":"TV",
  "model":" AA-55A9300A",
  "intent":"error question",
  "goal":{
    "function": "SERVICE A",
    "action": "NOT ABLE TO BE CONNECTED"
  },
  "answer":{
    "answerId":"1",
    "answerText":
",
    "docId":"101"
    "docScore":"1200"
  }
}
```

FIG. 7

```
{
"goal":{"function":"SERVICE A", "action":"NOT ABLE TO BE CONNECTED"},
"scenario":["TV_QA", "SERVICE A_QA", "Homenetwork_QA"]
}
```

FIG. 8

```
{
  "q":"NOT ABLE TO BE CONNECTED TO SERVICE A ON TV",
  "status": "0",
  "userId":"123456",
  "product":"TV",
  "model":" AA-55A9300A",
  "intent":"error question",
  "goal":{
    "function":"SERVICE A",
    "action": "NOT ABLE TO BE CONNECTED"
  },
  "answer":{
    "answerId":"1",
    "answerText": "CONNECT AFTER TURNING OFF POWER OF TV
",
    "docId":"101"
    "docScore":"1200"
  }
}
```

FIG. 9A

| INQUIRY INFORMATION |
|---|
| NOT ABLE TO BE CHARGED |

FIG. 9B

| INQUIRY INTENTION | STATUS | INQUIRY GOAL | |
|---|---|---|---|
| | | FUNCTION | SETTING /OPERATION |
| ERROR CONSULTATION | NEW | CHARGE | NOT POSSIBLE |

FIG. 9C

| FUNCTION | SETTING /OPERATION | DocID | ANSWER TEXT | NUMBER OF SOLUTION TIMES |
|---|---|---|---|---|
| CHARGE | NOT POSSIBLE | 101 | CONNECT AFTER TURNING OFF POWER OF THE DEVICE | 1200 |
| CHARGE | NOT POSSIBLE | 102 | DISCONNECT MICRO USB CABLE (ACCESSORY) ONCE AND RE-CONNECT | 204 |
| CHARGE | NOT POSSIBLE | 103 | USE MICRO USB CABLE (ACCESSORY) | 3 |
| CHARGE | NOT POSSIBLE | 104 | CHARGE AT TEMPERATURE RANGE (10°C-30°C) SUITABLE FOR CHARGE | 400 |

FIG. 9D

| INQUIRY INTENTION | PRODUCT NAME | MODEL NAME | DocID | ANSWER TEXT | ANSWER ID |
|---|---|---|---|---|---|
| ERROR CONSULTATION | | | 101 | CONNECT AFTER TURNING OFF POWER OF THE DEVICE | 1 |

INFORMATION PROCESSING DEVICE

CROSS REFERENCE TO RELATED APPLICATIONS

This application is a U.S. National Phase of International Patent Application No. PCT/JP2017/006081 filed on Feb. 20, 2017, which claims priority benefit of Japanese Patent Application No. JP 2016-107113 filed in the Japan Patent Office on May 30, 2016. Each of the above-referenced applications is hereby incorporated herein by reference in its entirety.

TECHNICAL FIELD

The present disclosure relates to an information processing device.

BACKGROUND ART

In recent years, various systems for responding to inquiries about a product or a service have been proposed. The above-mentioned system includes a Frequently Asked Questions (FAQ) system that searches an answer to an inquiry of a user by himself/herself. For example, Patent Literature 1 discloses a dialogue system in which a user can do a dialogue with the system and search an answer.

CITATION LIST

Patent Literature

Patent Literature 1: JP 2003-228575A

DISCLOSURE OF INVENTION

Technical Problem

However, a dialogue system described in Patent Literature 1 requires to structure in advance a dialogue scenario in response to an input from a user. Therefore, in the system described in Patent Literature 1, it is hard to flexibly respond to an inquiry from a user who does not correspond to the above-mentioned dialogue scenario.

Accordingly, according to the present disclosure, such an information processing device is proposed to enable the realization of dynamic and flexible dialogue in response to an inquiry from a user.

Solution to Problem

According to the present disclosure, there is provided an information processing device including: a reception unit that receives inquiry information; an acquisition unit that acquires answer information in response to the inquiry information from at least one or more acquisition destination candidates determined on a basis of the inquiry information; and a sending unit that sends response information that is generated on a basis of the answer information. The acquisition unit sends a request using a common data format to the at least one or more acquisition destination candidates, and acquires the answer information using a common data format based on the request.
There is provided a device.

In addition, according to the present disclosure, there is provided an information processing device including: a sending unit that sends collected inquiry information; a reception unit that receives response information generated on a basis of answer information acquired from at least one or more acquisition destination candidates determined on a basis of the inquiry information; and an output control unit that controls an output of the response information.

Advantageous Effects of Invention

As described above, according to the present disclosure, it is possible to realize a dynamic and flexible dialogue in response to an inquiry from a user. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a conceptual diagram for illustrating generation of an answer DB according to the embodiment.

FIG. 6 is an example of analysis information output by an analysis unit according to the embodiment.

FIG. 7 is an output example of scenario search by an acquisition unit according to the embodiment.

FIG. 8 is an example of answer information output from the answer DB according to the embodiment.

FIG. 9A is an example of inquiry information input by a user according to the embodiment.

FIG. 9B is an example of analysis information analyzed by the analysis unit according to the embodiment.

FIG. 9C is an example of answer information stored in the answer DB according to the embodiment.

FIG. 9D is an example of answer information returned from the answer DB according to the embodiment.

MODE(S) FOR CARRYING OUT THE INVENTION

Figure 1:
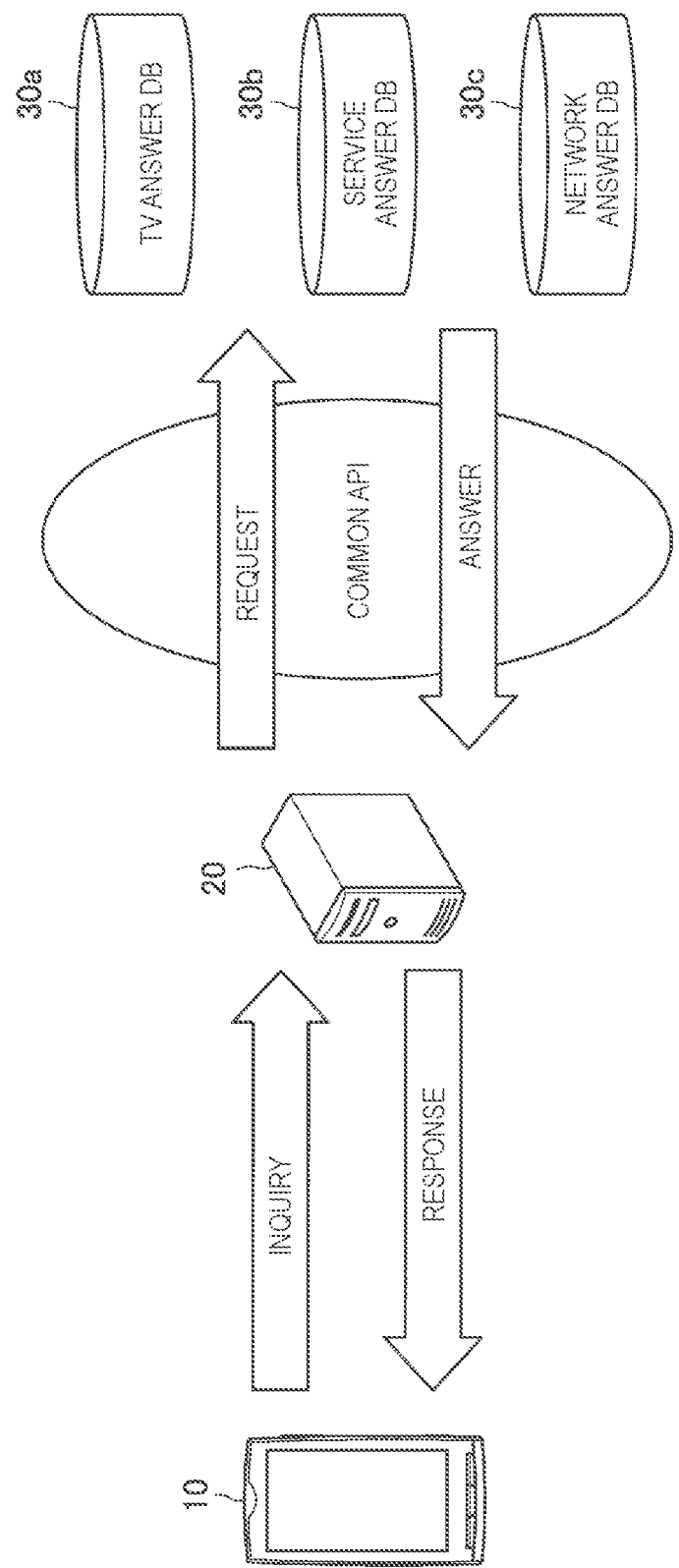
FIG. 1 is a conceptual diagram illustrating an overview according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It is noted that a description will be given in the following order.

1. Embodiment
   1.1. Overview according to embodiment of the present disclosure
   1.2. Example of system configuration 1.3. Example of functional configuration of information processing terminal 10
1.4. Example of functional configuration of information processing server 20
1.5. Generation of answer DB 30
1.6. Example relating to response to inquiry according to the embodiment
1.7. Processing flow of information processing server 20
2. Example of hardware configuration
3. Conclusion 1. Embodiment <<1.1. Overview According to Embodiment of the Present Disclosure>>

In recent years, with development of a communication technology, a user can acquire search information by various means. For example, in a case of issuing an inquiry about a purchased product or service, the user can issue an inquiry to a call center of a producing source or a selling source, and further search an answer to the user's inquiry from an opened site of the producing source or the selling source. Further, also in a case of cooperation that treats a product or a service, by providing the above-mentioned site, it is possible to promote self-solution to the user and reduce a load of business in the call center.

However, in the above-mentioned site, in many cases, only search to an answer sentence that is formed in advance is allowed. Therefore, in a general question/response system, in a case where a character string matching the information input by the user is not included in the answer sentence that is formed in advance, it is hard to present an answer required by the user.

On the other hand, in a case where the answer sentence that is formed in advance includes a plurality of pieces of the information input by the user, it is possible to present a numerous number of answers to the user. In this case, the user cannot find an answer that is required by the user from a presented numerous number of answers.

Further, in recent years, a large number of products or services are operated in cooperation with a plurality of devices including a server on a network. Therefore, in a case where a function on the product or service is not available, a user cannot easily separate the device that causes the case, and it is hard to narrow a proper inquiry destination.

A technical thought according to the present disclosure is devised by paying attention to the above-mentioned point, and a common interface between a plurality of devices or servers is defined, thereby enabling the generation of a flexible dialogue scenario in response to the inquiry of the user. Further, according to the present disclosure, it is possible to extract an inquiry intention of the user and generate proper answer information corresponding to the inquiry intention by analyzing an input of the user in language aspect.

Herein, first, a description will be given of an overview according to an embodiment of the present disclosure. FIG. 1 is a conceptual diagram illustrating an overview according to the embodiment. Referring to FIG. 1, a description will be given of an example of issuing an inquiry about the situation in a case where the user cannot be connected to a Web streaming service from TV.

Referring to FIG. 1, first, the user issues an inquiry about the above-mentioned situation to the information processing terminal 10. Herein, the information processing terminal 10 may be a device for collecting inquiry information of the user. For example, the user can issue various inquiries about a product or a service by voice input or character input. For example, the user may speak "Not able to be connected to service A on TV" (speech example 1) to issue an inquiry. The input of the user is completed, and the information processing terminal 10 sends the collected inquiry information to the information processing server 20.

The information processing server 20 extracts the inquiry intention from the inquiry information of the user, and acquires the answer information in response to the above-mentioned inquiry information from an acquisition candidate corresponding to the inquiry intention. In a case of the example, the information processing server 20 can acquire the answer information in response to the inquiry information from individual answer DBs 30a to 30c relating to "TV", "service A", and "network" on the basis of the above-mentioned speech example 1. In this case, the information processing server 20 may issue requests to the answer DBs 30a to 30c and acquire the answer information by using a common application programming interface (API).

Subsequently, the information processing server 20 generates response information that is output to the information processing terminal 10 on the basis of the acquired answer information. In this case, the information processing server 20 may generate the response information corresponding to an output function of the information processing terminal 10. The information processing server 20 generates, for example, response information including text information, various image information, voice information as a result of voice synthesis, and sends the response information to the information processing terminal 10.

Next, the information processing terminal 10 performs an output corresponding to the received response information, and presents an answer in response to the inquiry of the user. In a case of the example, the information processing terminal 10 may allow the display on a screen of, for example, text information "Turn off power of TV and connect.", or may output the output of the content from a speaker as voice.

With the above-mentioned flow, the user can perform various responses to the inquiry depending on information output by the information processing terminal 10. Further, herein, in a case where a failure or the like to the inquiry is not solved, the user inputs again the inquiry to the information processing terminal 10, and thus can acquire a new answer. As will be described later, the information processing server 20 according to the embodiment holds a status relating to the inquiry of the user, and can realize a proper dialogue corresponding to situations of a series of inquiries.

The above description is given of the overview according to the embodiment. As mentioned above, the information processing server 20 according to the embodiment can extract an inquiry intention of the user and acquire an answer to the inquiry from a plurality of acquisition candidates on the basis of the inquiry intention. Further, in this case, the information processing server 20 can communicate information with the answer DB 30 by using a common API. With the above-mentioned function provided for the information processing server 20, it is possible to realize a dialogue flexibly responding to the inquiry of the user. In the following, a description will be given of effects exhibited by characteristics on the functions of the information processing terminal 10 and the information processing server 20 according to the embodiment while picking up the characteristics.

<<1.2. Example of System Configuration>>

Figure 2:
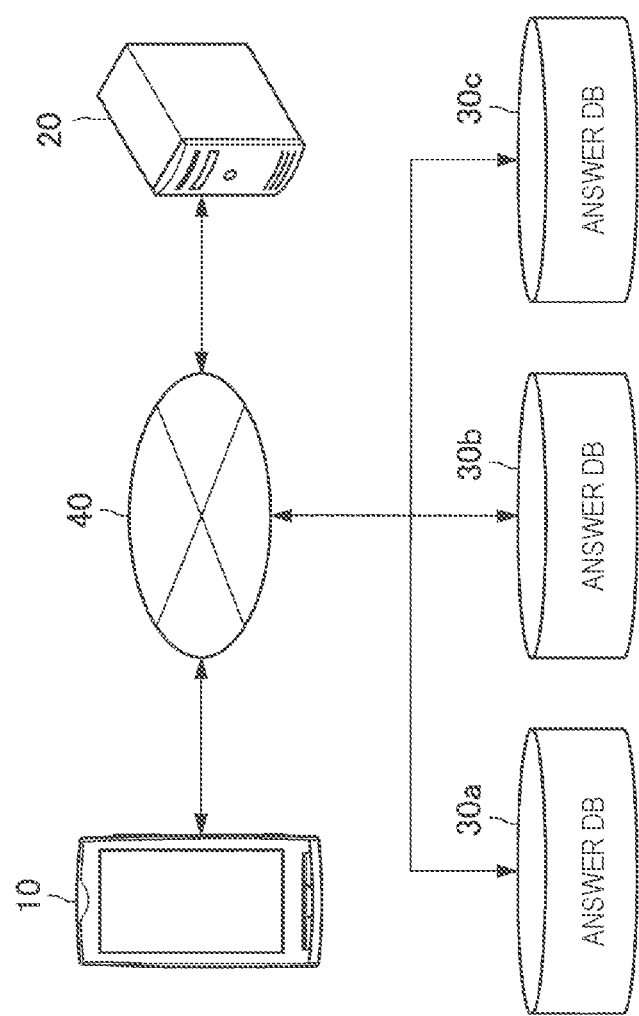
FIG. 2 is a diagram illustrating an example of a system configuration according to the embodiment.

Next, a description will be given of an example of a system configuration according to the embodiment. FIG. 2 is a diagram illustrating an example of the system configuration according to the embodiment. Referring to FIG. 2, an information processing system according to the embodiment includes the information processing terminal 10, the information processing server 20, and a plurality of the answer DBs 30. Further, the information processing terminal 10, the information processing server 20, and the answer DBs 30 are connected via a network 40 for mutual communication therebetween.

(Information Processing Terminal 10)

The information processing terminal 10 according to the embodiment is an information processing device used in a case where the user inputs an inquiry. Further, the information processing terminal 10 has a function for presenting, to the user, an answer in response to the inquiry of the user.

More specifically, the information processing terminal 10 may have a sending unit that sends collected inquiry information, and a reception unit that receives the response information that is generated on the basis of the answer information obtained from at least one or more acquisition destination candidates determined on the basis of the inquiry information. Further, the information processing terminal 10 further has an output control unit that controls an output of the response information.

The information processing terminal 10 according to the embodiment may be various information processing devices with the above-mentioned functions. The information processing terminal 10 may be, for example, a personal computer (PC), a smartphone, a tablet, a mobile phone, an autonomous robot, or the like.

(Information Processing Server 20)

The information processing server 20 according to the embodiment is an information processing device that acquires the answer information from a plurality of acquisition destination candidates based on the inquiry information of the user and generates the response information based on the answer information.

More specifically, the information processing server 20 has a reception unit that receives the inquiry information, and an acquisition unit that acquires the answer information in response to the inquiry information from at least one or more acquisition destination candidates determined on the basis of the inquiry information. Further, the information processing server 20 may further have a sending unit that sends the answer information that is generated on the basis of the answer information. Further, the information processing server 20 has a function for sending a request using a common data format to at least one or more acquisition destination candidates and acquiring the answer information using the common data format based on the request.

(Answer DB 30)

The answer DB 30 is a database that stores the answer information to the inquiry information of the user. The individual answer DB 30 according to the embodiment may store various answer information corresponding to an operation, such as product specification, service specification, or network specification. Therefore, the information system according to the embodiment may have a plurality of the answer DBs 30 corresponding to various technical information. It is noted that, in an example illustrated in FIG. 2, three answer DBs 30a to 30c are illustrated. The number and characteristics of answer DBs 30 according to the embodiment can be properly designed on the basis of a product, a service, system operation, or the like.

The answer DB 30 according to the embodiment can, for example, store information acquired by analyzing in language, a manual documentation or an online manual relating to a predetermined product or service. A configuration of the answer DB 30 according to the embodiment will be additionally described in details later.

(Network 40)

A network 40 has a function for connecting the information processing terminal 10, the information processing server 20, and the answer DB 30. The network 40 may include a public line network such as the Internet, a phone line network, and a satellite communication network, various local area networks (LANs) including Ethernet (registered trademark), a wide area network (WAN), or the like. Further, the network 40 may include a dedicated line network such as an Internet Protocol-Virtual Private Network (IP-VPN). Further, the network 40 may include a wireless communication network such as Wi-Fi (registered trademark) or Bluetooth (registered trademark).

<<1.3. Example of Functional Configuration of Information Processing Terminal 10>>

Figure 3:
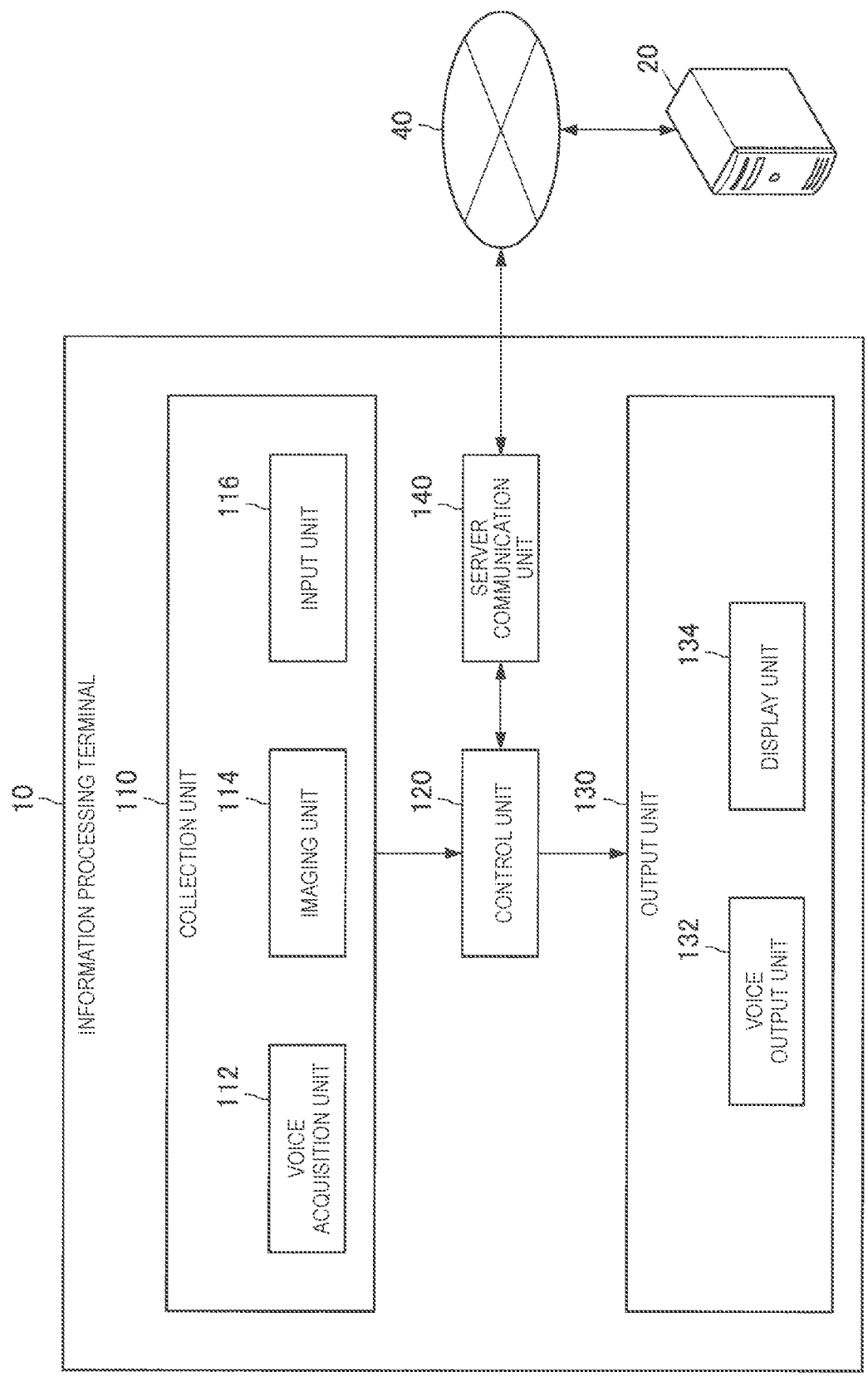
FIG. 3 is a functional block diagram of an information processing terminal according to the embodiment.

Next, a specific description will be given of an example of a functional configuration of the information processing terminal 10 according to the embodiment. FIG. 3 is a functional block diagram of the information processing terminal 10 according to the embodiment. Referring to FIG. 3, the information processing terminal 10 according to the embodiment has a collection unit 110, a control unit 120, an output unit 130, and a server communication unit 140. Further, the collection unit 110 according to the embodiment includes a voice acquisition unit 112, an imaging unit 114, and an input unit 116. Further, the output unit 130 according to the embodiment includes a voice output unit 132 and a display unit 134.

Hereinafter, regarding the above-mentioned configurations, a specific description will mainly be given to characteristics of the configuration. It is noted that a functional configuration illustrated in FIG. 3 is just an example, and the information processing terminal 10 according to the embodiment may further have a functional configuration other than that illustrated in FIG. 3. Functional configuration of the information processing terminal 10 according to the embodiment can be properly changed depending on characteristics of a device or an operation condition.

(Collection Unit 110)

The collection unit 110 has a function for collecting inquiry information of the user. Herein, the inquiry information may include speech information, text information, image information, operational information of the user, or the like. Therefore, the collection unit 110 may include various sensors or devices for detecting an input operation of the user or speech of the user. In particular, according to the embodiment, the collection unit 110 may include the voice acquisition unit 112, the imaging unit 114, and the input unit 116.

((Voice Acquisition Unit 112)

The voice acquisition unit 112 has a function for collecting speech information of the user. Herein, the speech information may include ambient sound or the like as well as speech generated by the user. The voice acquisition unit 112 can be realized by, for example, a microphone that converts voice of the user or ambient sound into an electrical signal.

((Imaging Unit 114)

The imaging unit 114 has a function for collecting the image information. The imaging unit 114 according to the embodiment can collect the image information about a product such as TV on the basis of, for example, an operation of the user. The imaging unit 114 can be realized by mainly, for example, an imaging device such as a charge coupled device (CCD) or a complementary metal-oxide-semiconductor (CMOS) and various lenses.

((Input Unit 116)

The input unit 116 has a function for detecting various input operations of the user to the information processing terminal 10. According to the embodiment, the input unit 116 can collect, for example, the inquiry information based on a character input. Further, the input unit 116 according to the embodiment has a function for collecting feedback information from the user to the output response information. The input unit 116 can be realized by, for example, various buttons, a keyboard, a mouse, a switch, and the like. Further, the input unit 116 may be realized by a touch panel shared as a display device.

(Control Unit 120)

The control unit 120 has a function for controlling individual processing executed by the information processing terminal 10. According to the embodiment, the control unit 120 may control, for example, an application relating to a response to the inquiry. Further, the control unit according to the embodiment may function as an output control unit that controls an output of the response information by the output unit 130.

(Output Unit 130)

The output unit 130 has a function for outputting the received response information on the basis of the control of the control unit 120. Herein, the response information output by the output unit 130 may include the voice information, the text information, or the image information. Therefore, the output unit 130 according to the embodiment may include various devices for outputting the response information. In particular, according to the embodiment, the output unit 130 may include the voice output unit 132 and the display unit 134.

((Voice Output Unit 132))

The voice output unit 132 has a function for converting an electrical signal into sound and outputting the sound. Specifically, the voice output unit 132 has a function for presenting, to the user, voice based on the voice information included in the received response information. The voice output unit 132 may include a speaker or an amplifier with the above-mentioned function.

((Display Unit 134))

The display unit 134 has a function for outputting with visual information on the basis of the received response information. The function may be realized by, for example, a cathode ray tube (CRT) display device, a liquid crystal display (LCD) device, or an organic light emitting diode (OLED) device. Further, the display unit 134 may have a function as an input unit that receives an operation of the user. A function as an input unit can be realized by, for example, a touch panel.

(Server Communication Unit 140)

A server communication unit 140 has a function for communication with the information processing server 20 via the network 40. The server communication unit 140 functions as, for example, a sending unit that sends collection information collected by the collection unit 110. Further, the server communication unit 140 functions as a reception unit that receives the response information that is generated on the basis of the answer information obtained from at least one or more acquisition destination candidates determined on the basis of the above-mentioned inquiry information.

Further, the server communication unit 140 according to the embodiment has a function for sending feedback information from the user in response to the response information output by the output unit 130. Further, the server communication unit 140 may have a function for receiving the response information generated on the basis of the feedback information.

The above specific description is given of the example of the functional configuration of the information processing terminal 10 according to the embodiment. As mentioned above, the information processing terminal 10 according to the embodiment can send the collected inquiry information, and receive the response information generated on the basis of the answer information acquired from at least one or more acquisition destination candidates determined on the basis of the inquiry information. That is, the information processing terminal 10 according to the embodiment can present, to the user, an answer acquired from a dialogue scenario generated on the basis of the inquiry of the user. With the above-mentioned function provided for the information processing terminal 10 according to the embodiment, it is possible to realize a more flexible and natural dialogue about the response to the inquiry.

It is noted that the above-mentioned functional configuration is an example and the functional configuration of the information processing terminal 10 according to the embodiment is not limited to the example. For example, the information processing terminal 10 may further have a function for recognizing the voice on the basis of the collected speech information of the user. Further, the information processing terminal 10 may further have a function for synthesizing artificial voice on the basis of the received response information. A functional configuration of the information processing terminal 10 according to the embodiment can be flexibly changed depending on a specification of the information processing terminal 10, a system operation, or the like.

<<1.4. Example of Functional Configuration of Information Processing Server 20>>

Figure 4:
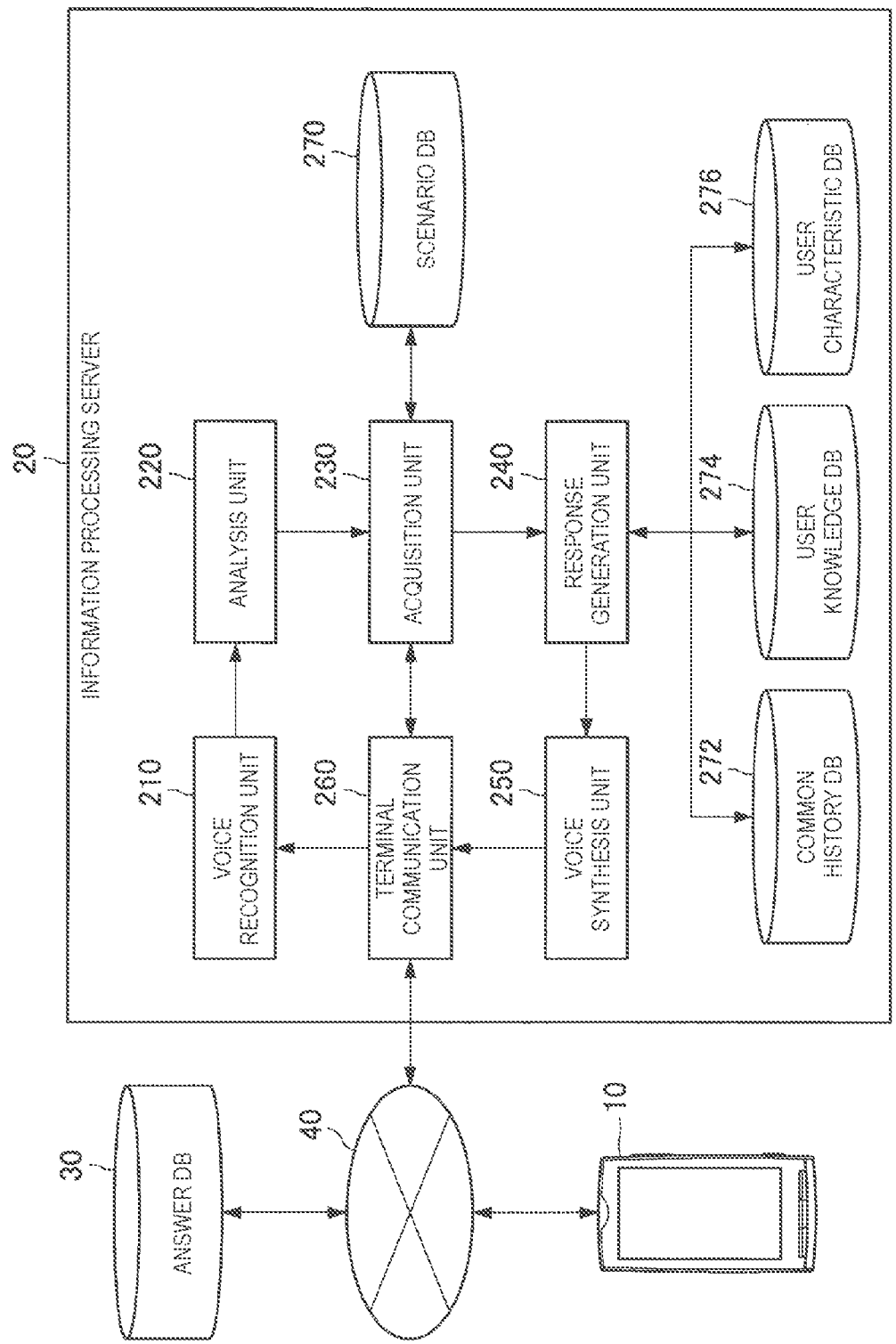
FIG. 4 is a functional block diagram of an information processing server according to the embodiment.

Next, a specific description will be given of an example of a functional configuration of the information processing server 20 according to the embodiment. FIG. 4 is a functional block diagram of the information processing server 20 according to the embodiment. Referring to FIG. 4, the information processing server 20 according to the embodiment has a voice recognition unit 210, an analysis unit 220, an acquisition unit 230, a response generation unit 240, a voice synthesis unit 250, and a terminal communication unit 260. Further, the information processing server 20 according to the embodiment may have a scenario DB 270, a common history DB 272, a user knowledge DB 274, and a user characteristic DB 276.

Hereinafter, regarding the above-illustrated configurations, a specific description will be mainly given of characteristics of the configurations. It is noted that the functional configuration illustrated in FIG. 4 is an example and a part of the functions illustrated in FIG. 4 may be realized as, for example, a function of the information processing terminal 10. The functional configuration of the information processing server 20 according to the embodiment can be properly changed by characteristics of a device, an operation condition, or the like.

(Voice Recognition Unit 210)

The voice recognition unit 210 has a function for recognizing the voice on the basis of the speech information collected by the voice acquisition unit 112 of the information processing terminal 10. Specifically, the voice recognition unit 210 may convert the voice signal included in the above-mentioned speech information into text information. In this case, the voice recognition unit 210 can recognize the voice by using, for example, a statistic method or a hidden Markov model that is widely used in a voice recognition field.

(Analysis Unit 220)

The analysis unit 220 has a function for analyzing an intention or a goal included in the character string information by analyzing, in language, of text information included in the inquiry information or text information recognized by the voice recognition unit 210. That is, the analysis unit 220 according to the embodiment can analyze the inquiry intention and an inquiry goal on the basis of the received inquiry information from the information processing terminal 10. It is noted that the inquiry information may include the speech information, the text information, the image information, the operation information of the user, or the like.

Herein, the inquiry intention may define a category for inquiry of the user. The inquiry intention may include, for example, purchase consultation, usage consultation, error/trouble consultation, specification check, or the like. As mentioned above, even the inquiry of the user to the same function has various inquiry. Therefore, the analysis unit 220 analyzes the inquiry intention, thereby enabling proper reflection of the inquiry intention of the user and improvement of inquiry precision. For example, in a case where the inquiry information is the above-mentioned speech example 1 "Not able to be connected to service A on TV", the analysis unit 220 may define the inquiry intention of the inquiry information as error/trouble consultation.

Further, the above-mentioned inquiry goal may be information for specifying a proper inquiry to the inquiry of the user. The analysis unit 220 analyzes the inquiry goal, and the acquisition unit 230, which will be described later, can improve the precision of the acquired answer information. For example, in a case where the inquiry information is the above-mentioned speech example 1, the analysis unit 220 can extract entity "function (function): service A" or "setting/operation (action): not able to be connected", and set as the inquiry goal.

FIG. 6 is an example of the analysis information output by the analysis unit 220. Referring to FIG. 6, it is understood that the analysis output information includes inquiry information ("q") of the user, and inquiry intention ("intent") and inquiry goal ("goal") analyzed from the inquiry information. As mentioned above, the analysis unit 220 analyzes the inquiry intention and the inquiry goal on the basis of the inquiry information. The acquisition unit 230, which will be described later, can acquire a dialogue scenario on the basis of the inquiry information of the user with high precision.

Further, obviously, an example of the analysis information illustrated in FIG. 6 includes an inquiry status ("status"), user ID ("userId"), product information ("product"), and product model information ("model"). Herein, the inquiry status may be information indicating a state of an inquiry of the user. The analysis unit 220 may determine an inquiry status of new, continue, or the like on the basis of, for example, the user ID sent from the information processing terminal 10 or session information. Further, the analysis unit 220 may determine the newness or continuousness of the inquiry on the basis of an inquiry goal of the inquiry information that is the same as that of the previous time. As mentioned above, the analysis unit 220 according to the embodiment can perform various analysis on the basis of the inquiry information of the user or other information acquired from the information processing terminal 10.

Further, the analysis unit 220 may recognize an image on the basis of image information received from the information processing terminal 10, and include a result of the image recognition in the analysis information. For example, the analysis unit 220 can identify a product and a model by recognizing a TV image included in the inquiry information.

(Acquisition Unit 230)

The acquisition unit 230 has a function for searching a scenario from the scenario DB 270 on the basis of the analysis information output by the analysis unit 220. Herein, the scenario DB 270 may be a database for managing at least one or more answer DBs 30 with a correspondence to the inquiry intention or an inquiry goal. That is, the acquisition unit 230 according to the embodiment can acquire an acquisition destination candidate in response to the answer information on the basis of the inquiry intention and the inquiry goal analyzed by the analysis unit 220. It is noted that the answer DB 30 according to the embodiment may be a database generated for each inquiry goal.

FIG. 7 illustrates an output example of scenario search by the acquisition unit 230. Referring to FIG. 7, obviously, the output example includes a dialogue scenario corresponding to the inquiry goal. In the example illustrated in FIG. 7, the scenario based on the inquiry goal analyzed from the above-mentioned speech example 1 is output. Herein, the scenario may include an acquisition destination candidate with high possibility for storing proper answer information in response of the inquiry of the user, that is, the answer DB 30 in priority order. A plurality of the answer DBs 30 for storing the answer information about TV, the service A, and the network is output on the basis of the inquiry goal analyzed from the speech example 1 in the example.

It is noted that, in this case, the acquisition unit 230 may acquire scenario depending on an inquiry history common to a plurality of users, an understanding level of the user who performs the inquiry, characteristics of the user who performs the inquiry, or the like.

For example, the acquisition unit 230 may determine the acquisition destination candidate for acquiring the answer information on the basis of information stored in the common history DB 272. Herein, the common history DB 272 may be a database that manages the history of the inquiry and answer common to a plurality of users. In a case of not being able to be connected to the service A, the common history DB 272 may store, for example, information about an answer whose highest number of solution times, information of the answer DB 30 that stores the answer, or the like. The acquisition unit 230 can acquire a proper acquisition destination candidate of the answer information to the inquiry information on the basis of information stored in the common history DB 272.

Further, for example, the acquisition unit 230 may determine the acquisition destination candidate to acquire the answer information on the basis of information stored in the user knowledge DB 274. Herein, the user knowledge DB 274 may be a database that manages knowledge of the user relating to a product or a service. The user knowledge DB 274 may store, for example, a knowledge level of the user who performs the inquiry or a vocabulary understandable by the user. In this case, information stored in the user knowledge DB 274 may be determined on the basis of reaction exhibited by the user to the past response to an inquiry. For example, in response to response information "turn on again power of rooter", in a case where the user performs feedback "what is rooter?", the user knowledge DB 274 may store that the user does not know vocabulary of the rooter or knowledge level about the network of the user is not high. The acquisition unit 230 can acquire more proper acquisition destination candidate of the answer information in response to the inquiry information on the basis of information stored by the user knowledge DB 274.

Further, for example, the acquisition unit 230 may determine the acquisition destination candidate for acquiring the answer information on the basis of information stored in the user characteristic DB 276. Herein, the user characteristic DB 276 may be a database that manages attribute information or history information about the user who performs the inquiry, or taste information of the user, or the like. The user characteristic DB 276 can store, for example, information about the inquiry history of the user who performs the inquiry. In this case, the acquisition unit 230 may determine the acquisition destination candidate of the answer information by referring inquiry performance to the past inquiry. Further, the user characteristic DB 276 may store information about the purchase history of the user. In this case, the acquisition unit 230 checks detailed information of TV, purchased in the past by the user, and can acquire a more suitable acquisition destination candidate. Further, the user characteristic DB 276 may store information about the taste of the user. The user characteristic DB 276 can store that, for example, the user tends to like response information using an image or tends not to click link included in the answer information. The acquisition unit 230 refers to taste information of the user stored in the user characteristic DB 276, thereby enabling the acquisition of the acquisition destination candidate of more suitable answer information.

The above description is given of the scenario search with the acquisition unit 230 according to the embodiment. Further, the acquisition unit 230 according to the embodiment has a function for acquiring the answer information in response to the inquiry information from the searched acquisition destination candidate. In this case, the acquisition unit 230 can send a request using a common API to the acquisition destination candidate, and can acquire the answer information using the common API based on the request. In this case, the acquisition unit 230 may issue the request by using the analysis information output by the analysis unit 220. That is, the request may include the inquiry intention or the inquiry goal.

Further, the acquisition unit 230 may acquire the answer information from a single answer DB 30 on the basis of the priority order of the acquisition destination candidate. In this case, the information processing server 20 sends the response information based on the above-acquired answer information to the information processing terminal 10 and, in a case where an inquiry in response to the response information is further issued, the answer information may be acquired again. The information processing server 20 according to the embodiment repeats the above-mentioned processing, thereby enabling the realization of a system dialogue relating to the inquiry.

On the other hand, the acquisition unit 230 may acquire once a plurality of pieces of the answer information from a plurality of the answer DBs 30 as the acquisition destination candidate. In this case, the above-mentioned answer information is stored, thereby enabling to respond to a further inquiry from the user.

FIG. 8 is an example of the answer information output from answer DB 30 according to the embodiment. It is noted that an example illustrated in FIG. 8 is an example of the answer information corresponding to the speech example 1 "Not able to be connected to service A on TV", output from the answer information DB 30 relating to "TV". As illustrated in FIG. 8, the answer information according to the embodiment may be subsequently output to the analysis information illustrated in FIG. 6. Referring to FIG. 8, the answer information according to the embodiment may include answer ID ("answerId"), answer text ("answerText"), document ID ("docId"), document score ("docScore"), and the like.

Herein, the above-mentioned answer ID may illustrate answer order to the same inquire. The information processing server 20 according to the embodiment manages answer ID with an inquiry status, thereby enabling the management of the inquiry and an answer state to the inquiry.

Further, the answer text may include contents of the answer to the inquiry extracted from information stored in the answer DB 30. It is noted that the answer text according to the embodiment may be information extracted on the basis of the inquiry intention and the inquiry goal included in the analysis information. In an example illustrated in FIG. 8, the answer text includes content "Connect after turning off power of TV".

Further, the document ID may be an identifier indicating an extraction source of the answer text. Further, the document score may be a number of times for referring to the answer text or numeral value data indicating the number of times for solving the problem by the answer text.

As mentioned above, the acquisition unit 230 according to the embodiment can acquire the answer information from the acquisition destination candidate based on the received inquiry information by using the common API.

(Response Generation Unit 240)

The response generation unit 240 has a function for generating the response information that is output by the information processing terminal 10 on the basis of the answer information acquired by the acquisition unit 230. Herein, the answer information may include the voice information, the text information, the image information, and the like.

Further, the response generation unit 240 according to the embodiment may generate the answer information based on the answer information acquired on the basis of information stored by the common history DB 272. That is, the response generation unit 240 according to the embodiment can generate the response information on the basis of history information common to users.

Further, the response generation unit 240 according to the embodiment may generate the response information based on the answer information acquired on the basis of information stored in the user knowledge DB 274. That is, the response generation unit 240 according to the embodiment can generate the response information on the basis of an understanding level of the user who inputs the inquiry information.

Further, the response generation unit 240 according to the embodiment may generate response information based on the answer information acquired on the basis of the information stored in the user characteristic DB 276. That is, the response generation unit 240 according to the embodiment can generate the response information on the basis of characteristic information of the user who inputs the inquiry information. It is noted that the characteristic information may include the history information or taste information of the user who inputs the inquiry information.

Further, the response generation unit 240 according to the embodiment can determine the solution on the basis of the inquiry information, and generate the response information in accordance with the solution determination. For example, the response generation unit 240 can determine whether or not the problem about the inquiry is solved by the user from a result of language analysis of the inquiry information that is newly input by the user after sending the response information. In this case, the response generation unit 240 may generate the response information, for example, "good" or the like on the basis of determination that the user solves the problem, or send response information generated from the answer information by the acquisition unit 230, including a sentence "Send a search result for future reference". On the other hand, in a case of determining that the user does not solve the problem yet, the response generation unit 240 can generate response information "searching other information. Please wait a little more" or the like, and send the response information as connection before obtaining the answer information to the information processing terminal 10. As mentioned above, the response generation unit 240 generates the answer information corresponding to the solution determination, thereby enabling the realization of more flexible and natural response to an inquiry.

Further, the response generation unit 240 according to the embodiment can generate the response information based on the feedback information of the user to the response information output by the information processing terminal 10. For example, in a case where the feedback information includes more specific information (for example, a device model, or the like), the response generation unit 240 may preferentially select the answer information including the information and generate the response information. Further, for example, the response generation unit 240 can generate the response information based on the answer information obtained from different answer DBs 30 on the basis of a fact that the above-mentioned feedback information is negative. As mentioned above, the response generation unit 240 generates the response information based on the feedback information, thereby enabling the realization of a more flexible system dialogue corresponding to an inquiry situation of the user.

It is noted that the response generation unit 240 may generate the response information based on the answer information on the basis of single answer information acquired by the acquisition unit 230. Further, the response generation unit 240 can select single answer information from a plurality of pieces of the answer information acquired from a plurality of the answer DBs 30 by the acquisition unit 230, and generate the response information based on the answer information. The generation of the response information according to the embodiment may be properly changed depending on a specification or amount of data of the information processing server 20.

(Voice Synthesis Unit 250)

The voice synthesis unit 250 has a voice synthesizing function for synthesizing artificial voice. The voice synthesis unit 250 can synthesize artificial voice on the basis of the text information included in the response information generated by the response generation unit 240 and add the artificial voice to the response information.

(Terminal Communication Unit 260)

The terminal communication unit 260 has a function for communication with the information processing terminal 10 and the answer DB 30 via the network 40. The terminal communication unit 260 may function as, for example, a reception unit that receives the inquiry information. Further, the terminal communication unit 260 can receive the feedback information from the user to the response information output by the information processing terminal 10. Further, the terminal communication unit 260 may function as a sending unit that sends the response information generated on the basis of the answer information.

The above specific description is given of the example of the functional configuration of the information processing server 20 according to the embodiment. As mentioned above, the information processing server 20 according to the embodiment has a function for determining the acquisition destination candidate of the answer information on the basis of the collected inquiry information. Further, the information processing server 20 according to the embodiment has a function for generating the response information based on the acquired answer information. In this case, the information processing server 20 can generate response information on the basis of, for example, common history information, an understanding level of the user, characteristic information of the user, or the like. Further, the information processing server 20 can generate the response information on the basis of the solution determination or the feedback information. With the functions provided for the information processing server 20 according to the embodiment, it is possible to realize a system dialogue that flexibly responds to the inquiry information.

It is noted that the above is given of the case as an example in which the information processing server 20 includes the scenario DB 270, the common history DB 272, the user knowledge DB 274, and the user characteristic DB 276. However, the functional configuration of the information processing server 20 according to the embodiment is not limited to the example. The individual servers may be attached to devices different from the information processing server 20. Further, as mentioned above, a part of the above-mentioned functional configuration may be realized as a function of the information processing terminal 10. For example, the information processing terminal 10 according to the embodiment may have a voice recognition function or a voice synthesis function. The functional configuration according to the embodiment can be properly changed.

<<1.5. Generation of Answer DB 30>>

Next, a specific description will be given of generation of the answer DB 30 according to the embodiment. FIG. 5 is a conceptual diagram for illustrating the generation of the answer DB 30 according to the embodiment. Referring to FIG. 5, the answer DB 30 according to the embodiment may be generated by analyzing a document D about a product, a service, or another technological information.

Herein, the document D may include a manual document or an online manual about a predetermined product or service, or technological information. Further, the document D according to the embodiment may include, for example, history information stored in a Q&A service or FAQ service opened on the Internet.

In the generation of the answer DB 30 according to the embodiment, first, the text information included in the document D is analyzed in language (function F1). In this case, an analysis method, for example, text mining may be used for the language analysis. Further, in this case, it is possible to extract an identifier or a page number of a document as the analysis source as well as the analysis information.

Subsequently, the generation of the answer structure is embodied on the basis of the analysis result analyzed by the function F1 (function F2). Herein, processing for converting the analysis result into a common API and data specification of the answer DB 30 may be executed.

The above description is given of the generation of the answer DB 30 according to the embodiment. The information processing server 20 according to the embodiment can refer to the above-generated answer DB 30, and present, to the user, the response information based on the answer information included in the existing document D.

It is noted that the processing of the answer DB 30 according to the embodiment may also be periodically or non-periodically executed after starting the operation of the system. By updating the answer DB 30 in accordance with the situation, the information processing server 20 can use new answer information. Further, for example, in a case of managing the document D by a document management server or the like, every time for updating the document D, it may be designed to update together the answer information of the answer DB 30. In this case, the information processing server 20 can always generate the response information on the basis of the newest answer information.

<<1.6. Example Relating to Response to Inquiry According to the Embodiment>>

The above specific description is given of the functions of the information processing terminal 10, the information processing server 20, and the answer DB 30 according to the embodiment. Subsequently, a description will be given of an example of response to an inquiry according to the embodiment.

(Example of Acquiring Answer Information)

First, a description will be given of an example of acquiring the answer information according to the embodiment with reference to FIGS. 9A, 9B, 9C, and 9D. FIG. 9A is an example of the inquiry information input by the user. Hereinafter, in the example, a case will be described of an example in which the inquiry information of the user has content that "not able to be charged". As mentioned above, the user may input the inquiry information as text to the input unit 116 of the information processing terminal 10, or speak to the information processing terminal 10, thereby enabling input of the inquiry information. The inquiry information of the user is collected by the collection unit 110, and is sent to the information processing server 20 via the server communication unit 140.

FIG. 9B illustrates an example of the analysis information analyzed by the analysis unit 220 in the information processing server 20. As mentioned above, the analysis information may include the inquiry intention and the inquiry goal. FIG. 9B illustrates an example in a case where the inquiry intention is "error consultation" and the inquiry goal is "function: Charge", or "setting/operation: Not possible". Further, as illustrated in FIG. 9B, the analysis information may include the inquiry status. Referring to FIG. 9B, the inquiry information in the example indicates "new". The acquisition unit 230 in the information processing server 20 acquires information of the answer DB 30 as an answer destination candidate from the scenario DB 270 by using the analysis information analyzed by the analysis unit 220, and embodies a request of the answer information using the analysis information to the corresponding answer DB 30.

FIG. 9C is an example of the answer information stored in the answer DB 30. Referring to FIG. 9C, the answer DB 30 stores answer text relating to "function" and "operation/setting" corresponding to the inquiry goal. Further, as illustrated in FIG. 9C, the answer DB 30 may include document ID (DocID) indicating the source of the answer information or information such as a number of solutions indicating the number of solutions of the problem using the answer information. The answer DB 30 can search the answer information to the inquiry information on the basis of a request from the acquisition unit 230, and return a search result to the acquisition unit 230. It is noted that the answer information illustrated in FIG. 9C is just an example, and the answer information stored in the answer DB 30 may include information other than that illustrated in FIG. 9C. The answer DB 30 may store, for example, a product name or a model name together.

FIG. 9D illustrates an example of the answer information returned from the answer DB 30. Referring to FIG. 9D, the answer information includes answer text "Connect after turning off power of the device" extracted on the basis of the analysis information illustrated in FIG. 9B. As mentioned above, the answer DB 30 can return the answer information corresponding to the inquiry goal included in the analysis information to the acquisition unit 230. Further, in this case, the answer DB 30 may return a search result based on common history information on the basis of control of the acquisition unit 230. In a case of the example, the answer DB 30 sends answer information with the largest number of solutions in the answer information relating to the inquiry goal by using the common API. Further, as illustrated in FIG. 9D, the answer information according to the embodiment may include document ID or answer ID as well as answer text. Further, in a case of including more detailed information to identify a product or the like by the analysis information, the answer DB 30 may include a product name or a model name acquired on the basis of the information in the answer information and send the information.

The above description is given of the example of acquiring the answer information according to the embodiment. The information processing server 20 according to the embodiment can generate the response information on the basis of the above-acquired answer information, and send the response information to the information processing terminal 10.

(Example of Output of Response Information)

Figure 10:
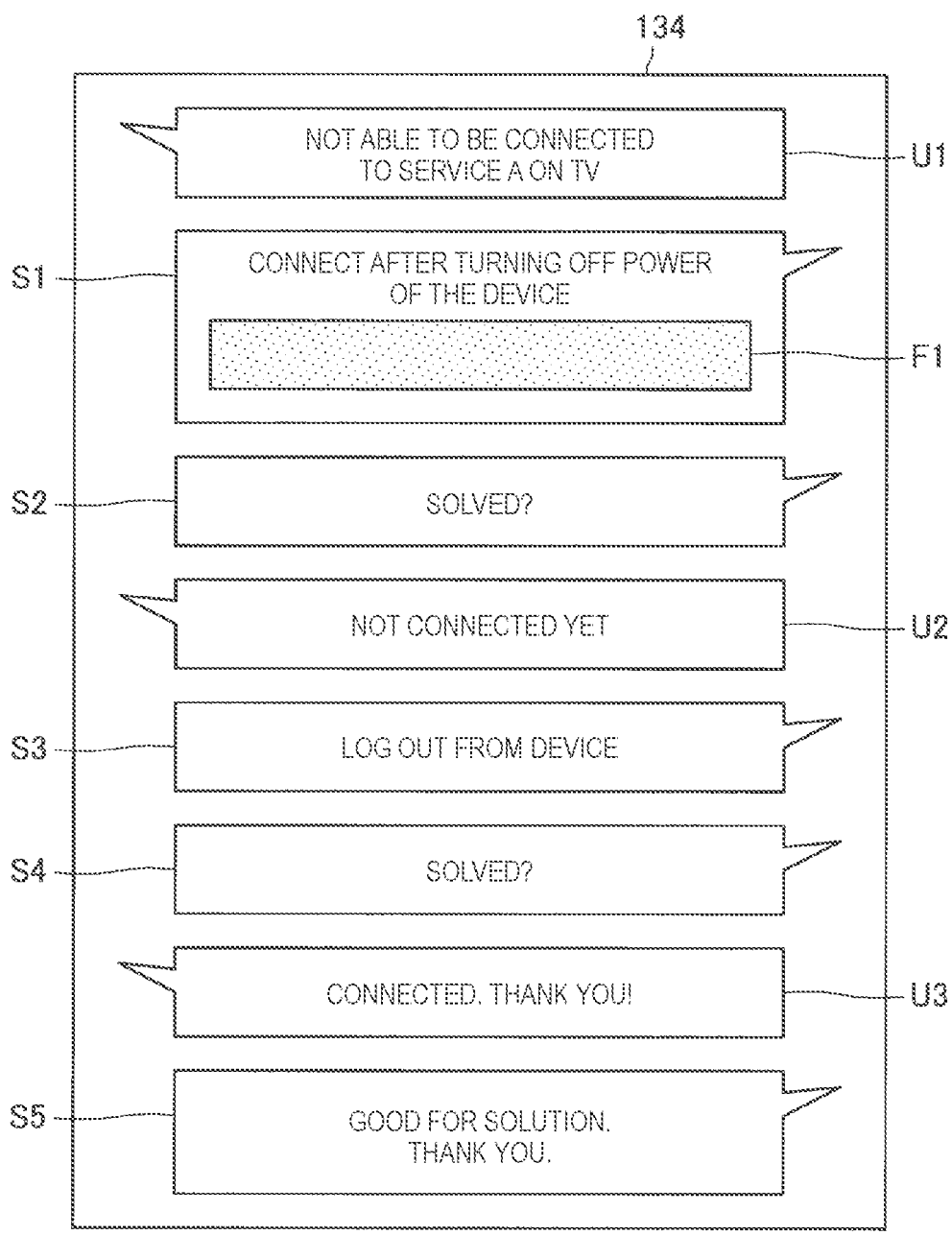
FIG. 10 is a diagram illustrating an example of answer information displayed by a display unit according to the embodiment.

Next, a description will be given of an example of an output of the response information by the information processing terminal 10 according to the embodiment. FIG. 10 is a diagram illustrating the example of the response information displayed on the display unit 134 in the information processing terminal 10 according to the embodiment.

Referring to FIG. 10, first, the user performs a user input U1 "Not able to be connected to service A" as the inquiry information. Herein, the information processing server 20 may acquire the answer information based on the user input U1, and generate the response information based on the answer information. The information processing terminal 10 receives the above-generated response information and performs a system output S1 "Connect after turning off power of the device". It is noted that, in this case, the information processing terminal 10 may perform the system output S1 including image information F1 on the basis of the information received from the information processing server 20. In a case of the example, the image information indicating, for example, a place of the power of the device may be used for the image information F1.

Further, as illustrated in FIG. 10, the information processing terminal 10 can perform a system output S2 for promoting feedback of the user on the basis of the response information received from the information processing server 20.

In a case of the example illustrated in FIG. 10, the user performs a user input U2 "Not connected yet" as feedback information to the system output S2. In this case, the information processing server 20 may acquire or select new answer information on the basis of the user input U2, generate the response information based on the answer information. In a case of the example, the information processing terminal 10 receives the response information generated on the basis of the user input U2, and performs a system output S3 "Log out from device". Further, the information processing terminal 10 may perform a system output S4 having intention similar to the system output S2.

In the example illustrated in FIG. 10, the user performs a user input U3 "Connected. Thank you!" as feedback information to the system output S4. As mentioned above, the information processing terminal 10 and the information processing server 20 according to the embodiment have an effect to easily acquire the feedback information from the user by realizing a natural system dialogue. Further, in this case, the information processing server 20 can generate the response information based on the feedback information included in the user input U3. In FIG. 10, the information processing terminal 10 receives the response information generated based on the user input U3, and performs a system output S5.

The above description is given of the output of the response information with the information processing terminal 10 according to the embodiment with the example. It is noted that the above description is given of the example of the case of realizing the input of the inquiry information and the output of the response information with the text information. However, the voice information may realize the input of the inquiry information and the output of the answer information according to the embodiment.

<<1.7. Processing Flow of Information Processing Server 20>>

Figure 11:
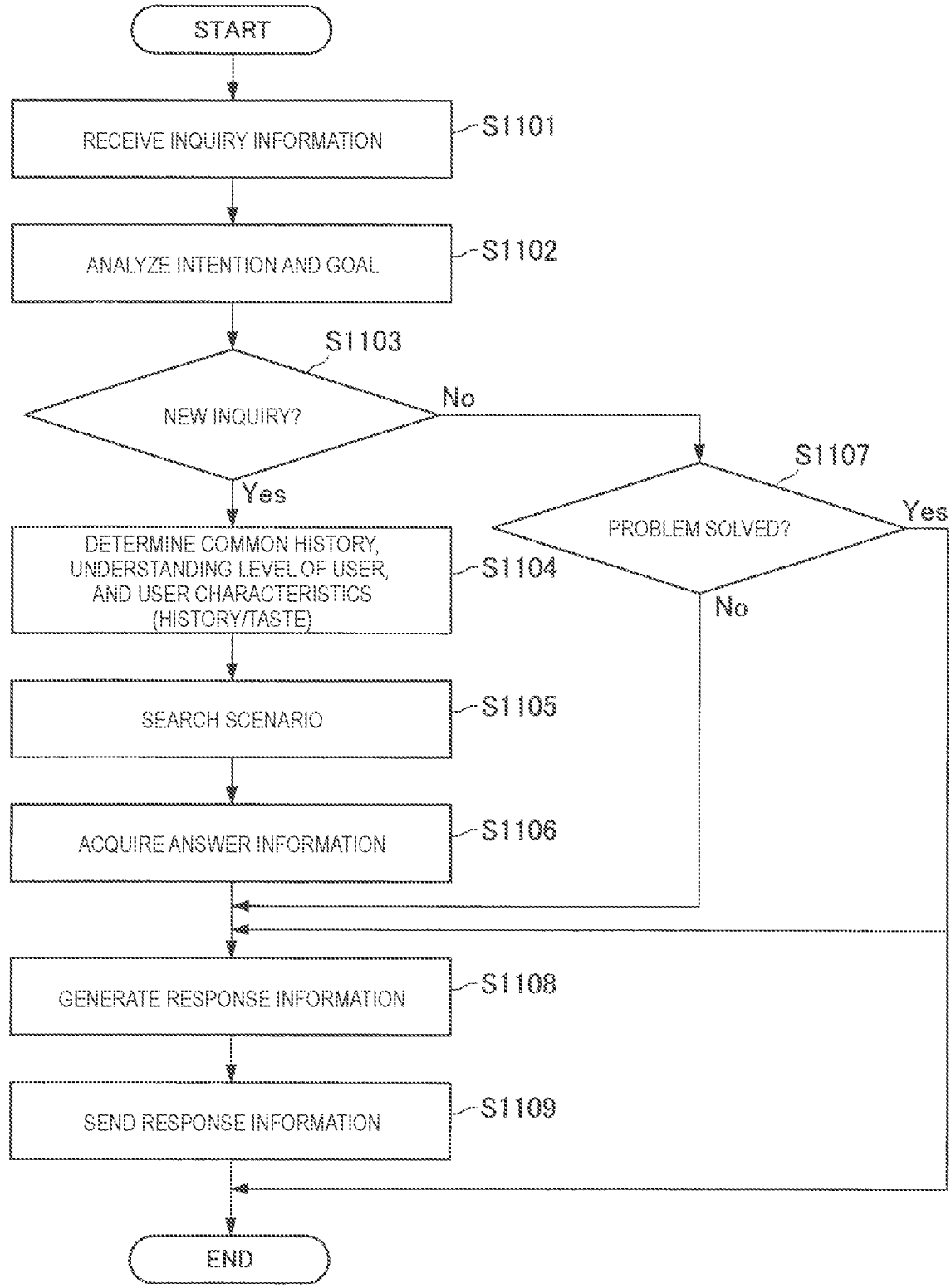
FIG. 11 is a flowchart illustrating a processing flow of the information processing server according to the embodiment.

Next, a specific description will be given of a processing flow of the information processing server 20 according to the embodiment. FIG. 11 is a flowchart illustrating the processing flow of the information processing server 20.

Referring to FIG. 11, first, the terminal communication unit 260 in the information processing server 20 receives the inquiry information from the information processing terminal 10 (S1101).

Next, the analysis unit 220 analyzes the inquiry intention and the inquiry goal on the basis of the received inquiry information in step S1101 (S1102).

Next, the acquisition unit 230 determines whether or not the inquiry information received in step S1101 is a new inquiry (S1103). Herein, in a case of determining that the inquiry information is a new inquiry (S1103: Yes), the acquisition unit 230 subsequently determines a common history, an understanding level of the user, and characteristics of the user (S1104). The acquisition unit 230 can perform the above determination on the basis of information stored in the common history DB 272, the user knowledge DB 274, and the user characteristic DB 276. It is noted that the above characteristic information may include history information or taste information of the user who inputs the inquiry information.

Next, the acquisition unit 230 searches a scenario from the scenario DB 270 on the basis of the analysis information analyzed in step S1102 and the determination result in step S1104, and determines the answer DB 30 as an acquisition destination candidate (S1105).

Subsequently, the acquisition unit 230 acquires the answer information to the inquiry information from the answer DB 30 determined in step S1105 (S1106).

On the other hand, in a case where the inquiry information received in step S1101 is not a new inquiry in step S1103 (S1103: No), the acquisition unit 230 determines the solution on the basis of the inquiry information (S1107). Herein, in a case where the problem about the inquiry is solved (S1107: Yes), the information processing server 20 may end the processing and respond to the next inquiry information, or shift to generation of the answer information on the basis of the determination.

On the other hand, in a case of determining that the problem about the inquiry is not solved in step S1107 (S1107: No) and the acquisition of the answer information in step S1106 ends, the response generation unit 240 generates the response information on the basis of the answer information acquired in step S1106 or a determination result in step S1107 (step S1108).

Next, the terminal communication unit 260 sends the response information generated in step S1108 to the information processing terminal 10 (S1109), and the information processing server 20 ends a series of processing.

2. Example of Hardware Configuration

Figure 12:
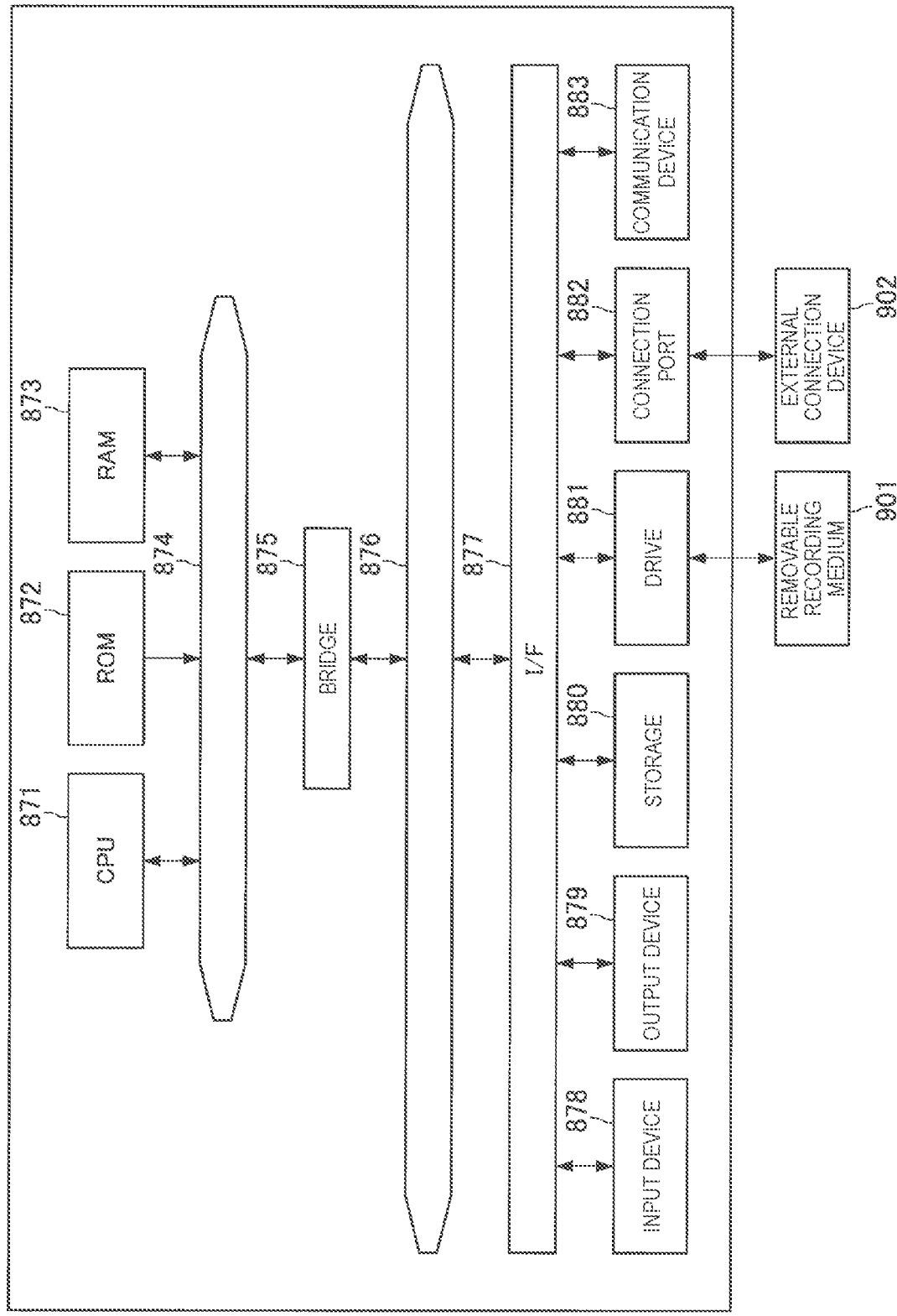
FIG. 12 is an example of a hardware configuration diagram according to the present disclosure.

Next, a description will be given of an example of a hardware configuration common to the information processing terminal 10 and the information processing server 20 according to the present disclosure. FIG. 12 is a block diagram illustrating the example of the hardware configuration of the information processing terminal 10 and the information processing server 20 according to the present disclosure. Referring to FIG. 12, the information processing terminal 10 and the information processing server 20 have, for example, a CPU 871, a ROM 872, a RAM 873, a host bus 874, a bridge 875, an external bus 876, an interface 877, an input device 878, an output device 879, a storage 880, a drive 881, a connecting port 882, and a communication device 883. It is noted that a hardware configuration illustrated herein is an example, and a part of components may be omitted. Further, a component other than those illustrated in herein may be further included.

(CPU 871)

The CPU 871 functions as, for example, an operation processing device or a control device, and controls the whole or a part of the components on the basis of various programs recorded in the ROM 872, the RAM 873, the storage 880, or a removable recording medium 901.

(ROM 872, RAM 873)

The ROM 872 is means that stores a program read by the CPU 871, data used for operation, or the like. The RAM 873 stores temporarily or infinitely, for example, the program read by the CPU 871, various parameters that are properly changed in a case of executing the program or the like.

(Host Bus 874, Bridge 875, External Bus 876, Interface 877)

The CPU 871, the ROM 872, and the RAM 873 are mutually connected via, for example, a host bus 874 that can transfer data at high speed. On the other hand, the host bus 874 is connected to the external bus 876 at data transfer speed that is relatively lower via, for example, the bridge 875. Further, the external bus 876 is connected to various components via an interface 877.

(Input Device 878)

For example, a mouse, a keyboard, a touch panel, a button, a switch, a lever, or the like is used for the input device 878. Further, as the input device 878, it is possible to use a remote controller (hereinafter, remote controller) that can send a control signal by using infrared or another electrical waves.

(Output Device 879)

An output device 879 is a device that can visibly or audibly send, to a user, a notification of acquired information from a display device such as a cathode ray tube (CRT), an LCD, or an organic EL, or an audio output device such as a speaker and a headphone, a printer, a mobile phone, a facsimile, or the like.

(Storage 880)

A storage 880 is a device for storing various data. As the storage 880, for example, it is possible to use a magnetic storage device such as a hard disk drive (HDD), a semiconductor storage device, an optical storage device, a magneto-optical storage device, or the like.

(Drive 881)

A drive 881 is a device that reads information recorded to a removable recording medium 901 such as a magnetic disk, an optical disk, an optical magnetic disk, or a semiconductor memory, or a device that writes information to the removable recording medium 901.

(Removable Recording Medium 901)

A removable recording medium 901 is various semiconductor storage media, for example, a DVD media, a Blu-ray (registered trademark) media, an HD DVD media, or the like. Of course, the removable recording medium 901 may be, for example, an IC card having a noncontact-type IC chip, an electrical device, or the like.

(Connecting Port 882)

A connecting port 882 is a port for connection of an external connection device 902 such as a universal serial bus (USB) port, an IEEE1394 port, a small computer system interface (SCSI), an RS-232C port, or an optical audio terminal.

(External Connection Device 902)

The external connection device 902 is, for example, a printer, a mobile music player, a digital camera, a digital video camera, an IC recorder, or the like.

(Communication Device 883)

A communication device 883 is a communication device for connection to a network, for example, a wired or wireless LAN, Bluetooth (registered trademark), a communication card for wireless USB (WUSB), a router for optical communication, a router for an asymmetric digital subscriber line (ADSL), a modem for various communications, or the like.

3. Conclusion

As mentioned above, the information processing server 20 according to the one embodiment of the present disclosure has a function for determining the acquisition destination candidate of the answer information on the basis of collected inquiry information. Further, the information processing server 20 according to the one embodiment of the present disclosure has a function for generating the response information based on the acquired answer information. In this case, the information processing server 20 can generate the response information on the basis of, for example, common history information, an understanding level of the user, characteristic information of the user, or the like. Further, the information processing server 20 can generate the response information on the basis of the solution determination or the feedback information. With the configuration, it is possible to realize a dynamical and flexible dialogue corresponding to the inquiry from the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, steps in processing of the information processing server 20 according to the present specification do not necessarily need to be processed on time series in order described as a flowchart. For example, steps in the processing of the information processing server 20 may be processed in order different from that described as a flowchart or be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a reception unit that receives inquiry information;

an acquisition unit that acquires answer information in response to the inquiry information from at least one or more acquisition destination candidates determined on a basis of the inquiry information; and a sending unit that sends response information that is generated on a basis of the answer information, in which the acquisition unit sends a request using a common data format to the at least one or more acquisition destination candidates, and acquires the answer information using a common data format based on the request.

(2)

The information processing device according to (1), in which the request includes at least any of an inquiry intention or an inquiry goal.

(3)

The information processing device according to (2), in which the acquisition unit acquires the acquisition destination candidate on a basis of at least any of the inquiry intention or the inquiry goal analyzed from the inquiry information.

(4)

The information processing device according to any one of (1) to (3), further including:

a response generation unit that generates the response information on the basis of the answer information.

(5)

The information processing device according to (4), in which the response generation unit generates the response information on a basis of history information common to users.

(6)

The information processing device according to (4) or (5), in which the response generation unit generates the response information on a basis of an understanding level of a user who inputs the inquiry information.

(7)

The information processing device according to any one of (4) to (6), in which the response generation unit generates the response information on a basis of characteristic information of a user who inputs the inquiry information.

(8)

The information processing device according to (7), in which the characteristic information includes at least any of history information or taste information of the user who inputs the inquiry information.

(9)

The information processing device according to any one of (4) to (8),
in which the response generation unit performs solution determination of a problem on the basis of the inquiry information, and generates the response information in accordance with the solution determination.

(10)

The information processing device according to any one of (4) to (9),
in which the reception unit receives feedback information to the response information, and
the response generation unit generates the response information based on the feedback information.

(11)

The information processing device according to any one of (1) to (10), further including:
an analysis unit that analyzes the inquiry intention and an inquiry goal on the basis of the inquiry information.

(12)

The information processing device according to any one of (1) to (11),
in which the inquiry information includes at least any of speech information, text information, image information, or operation information.

(13)

The information processing device according to any one of (1) to (12),
in which the response information includes at least any of voice information, text information, or image information.

(14)

An information processing device including:
a sending unit that sends collected inquiry information;
a reception unit that receives response information generated on a basis of answer information acquired from at least one or more acquisition destination candidates determined on a basis of the inquiry information; and
an output control unit that controls an output of the response information.

(15)

The information processing device according to (14), further including:
a collection unit that collects the inquiry information,
in which the inquiry information includes at least any of speech information, text information, image information, or operation information.

(16)

The information processing device according to (14) or (15),
in which the response information includes at least any of voice information, text information, or image information.

(17)

The information processing device according to (15),
in which the collection unit collects feedback information to the response information,
the sending unit sends the feedback information, and
the reception unit receives response information generated on a basis of the feedback information.

REFERENCE SIGNS LIST 10 information processing terminal
110 collection unit
112 voice acquisition unit
114 imaging unit
116 input unit
120 control unit
130 output unit
132 voice output unit
134 display unit
140 server communication unit
20 information processing server
210 voice recognition unit
220 analysis unit
230 acquisition unit
240 response generation unit
250 voice synthesis unit
260 terminal communication unit
270 scenario DB
272 common history DB
274 user knowledge DB
276 user characteristic DB
30 answer DB
40 network

The invention claimed is:

1. An information processing device, comprising:
a central processing unit (CPU) configured to:
receive inquiry information of an inquiry;
acquire scenario information from a scenario database based on the inquiry information, wherein the acquired scenario information includes information of a plurality of acquisition destination candidates;
acquire answer information from one acquisition destination candidate of the plurality of acquisition destination candidates based on a common data format, the acquired scenario information, and a priority order of the one acquisition destination candidate, wherein
the common data format includes a status associated with the inquiry, and
the status includes an inquiry status and an answer identification (ID) corresponding to the inquiry status;
determine the inquiry status based on a user ID associated with the inquiry;
generate first response information based on the acquired answer information, the determined inquiry status, and the answer ID; and
transmit the generated first response information.

2. The information processing device according to claim 1, wherein the CPU is further configured to:
analyze an inquiry intention and an inquiry goal of the inquiry based on the inquiry information;
transmit a request to the one acquisition destination candidate, wherein the request includes at least one of the inquiry intention or the inquiry goal; and
acquire the answer information from the one acquisition destination candidate based on the request.

3. The information processing device according to claim 2, wherein the CPU is further configured to acquire the one acquisition destination candidate based on at least one of the inquiry intention or the inquiry goal.

4. The information processing device according to claim 1, wherein the CPU is further configured to generate the first response information based on history information common to a plurality of users.

5. The information processing device according to claim 1, wherein
the CPU is further configured to generate the first response information based on an understanding level of a user, and
the user is associated with the inquiry information.

6. The information processing device according to claim 1, wherein the CPU is further configured to generate the first response information based on characteristic information of a user, and the user is associated with the inquiry information.

7. The information processing device according to claim 6, wherein the characteristic information includes at least one of history information or taste information of the user.

8. The information processing device according to claim 1, wherein the CPU is further configured to:
execute solution determination of a problem based on the inquiry information; and
generate the first response information based on the solution determination.

9. The information processing device according to claim 1, wherein the CPU is further configured to:
receive feedback information of the transmitted first response information; and
generate second response information based on the feedback information.

10. The information processing device according to claim 1, wherein the CPU is further configured to analyze an inquiry intention of the inquiry and an inquiry goal of the inquiry based on the inquiry information.

11. The information processing device according to claim 1, wherein the inquiry information includes at least one of speech information, text information, or image information.

12. The information processing device according to claim 1, wherein the generated first response information includes at least one of voice information, text information, or image information.

13. A first information processing device, comprising:
a central processing unit (CPU) configured to:
transmit inquiry information of an inquiry to a second information processing device;
receive first response information from the second information processing device based on the transmitted inquiry information, wherein
the second information processing device:
acquires scenario information from a scenario database based on the inquiry information transmitted by the first information processing device, wherein the acquired scenario information includes information of a plurality of acquisition destination candidates,
acquires answer information from one acquisition destination candidate of the plurality of acquisition destination candidates based on a common data format, the acquired scenario information, and a priority order of the one acquisition destination candidate, wherein
the common data format includes a status associated with the inquiry, and
the status includes an inquiry status and an answer identification (ID) corresponding to the inquiry status,
determines the inquiry status based on a user ID associated with the inquiry, and
generates the first response information based on the acquired answer information, the determined inquiry status, and the answer ID; and
control output of the received first response information.

14. The first information processing device according to claim 13, wherein the inquiry information includes at least one of speech information, text information, or image information.

15. The first information processing device according to claim 13, wherein the received first response information includes at least one of voice information, text information, or image information.

16. The first information processing device according to claim 14, wherein the CPU is further configured to:
determine feedback information of the received first response information;
transmit the feedback information to the second information processing device; and
receive second response information based on the transmitted feedback information.

17. The information processing device according to claim 1, wherein the CPU is further configured to:
receive feedback information, of the transmitted first response information, in the common data format, wherein the feedback information includes the inquiry status and the answer ID; and
transmit second response information based on the inquiry status and the answer ID in the feedback information.

* * * * *